(No Model.)

W. J. KAUFFMAN.
BRACKET FOR ATTACHING SPRINGS TO VEHICLES.

No. 542,893. Patented July 16, 1895.

Witnesses
C. W. Miles
Oliver B. Kaiser

Inventor
William J. Kauffman
By Wood & Boyd
Attorneys

UNITED STATES PATENT OFFICE.

WILLIAM J. KAUFFMAN, OF MIAMISBURG, OHIO.

BRACKET FOR ATTACHING SPRINGS TO VEHICLES.

SPECIFICATION forming part of Letters Patent No. 542,893, dated July 16, 1895.

Application filed December 5, 1894. Serial No. 530,933. (No model.)

*To all whom it may concern:*

Be it known that I, WILLIAM J. KAUFFMAN, residing at Miamisburg, in the county of Montgomery and State of Ohio, have invented certain new and useful Improvements in Brackets for Attaching Springs to Vehicles, of which the following is a specification.

The object of my invention is to provide a bracket for attaching springs directly to the body of a vehicle.

It is primarily adapted for connecting the springs to the front of an inclined vehicle-body.

The features of my invention will be more fully set forth in the description of the accompanying drawings, making a part of this specification, in which—

Figure 1:
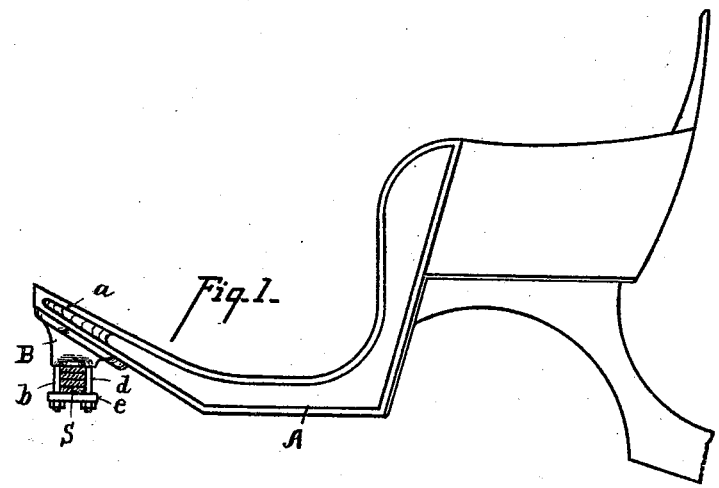
Figure 2:
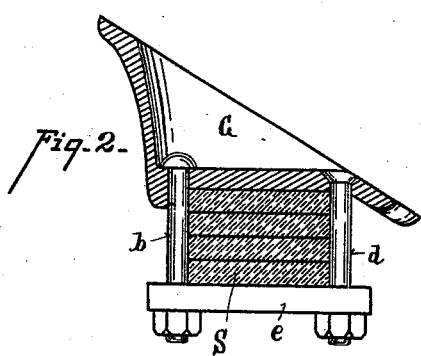
Figure 3:
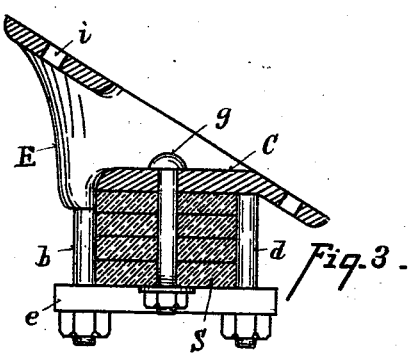
Figure 4:
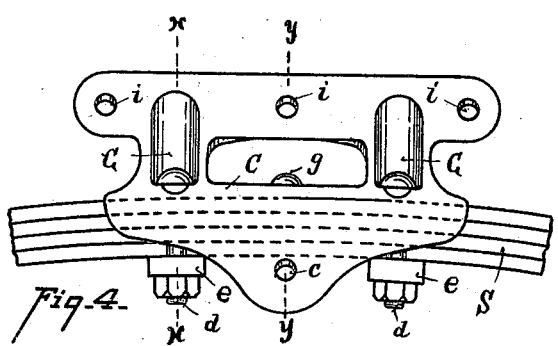
Figure 5:
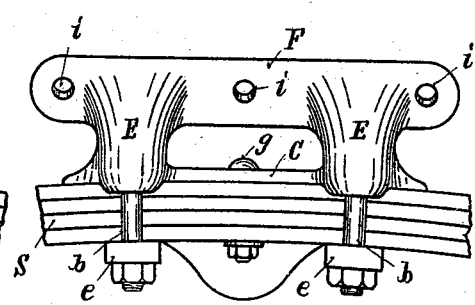

Figure 1 is a side elevation of my improvement attached to a carriage-body. Fig. 2 is a section, partly in elevation, on line $x\ x$, Fig. 4. Fig. 3 is a section on line $y\ y$, Fig. 4. Fig. 4 is a plan view of the bracket and spring. Fig. 5 is a front elevation of Fig. 4.

A represents the vehicle-body; B, the bracket which is attached to the under side of the inclined front end $a$. This bracket is made with an angle-brace consisting of the base-plate C, which inclines rearward, terminating in a plate $c$, which forms a shield for the spring S.

E E represent bosses depending from the upper plate F. These are preferably geared out, forming recesses G. The bottoms of these bosses are plain-faced and are preferably projected below the top of the spring which seats in the bottom-plate C and against the bosses E E, so as to form an angle-brace, the seat of the spring being formed in the bracket. The spring is secured in place by clip-bolts $b\ d$ and clip-bar $e$.

$i\ i$ represent bolt-holes pierced through the plates C F, the upper faces of which plates are a plane and seat firmly against the under-inclined end of the body, as shown in Fig. 1.

Several advantages are obtained by the use of the bracket. First, the body can be hung low down; second, it makes a firm support for the spring and forms a seat in the bracket, and the spring is firmly secured in the seat by the bolts and clip-bar.

$g$ represents the central bolt passing through the lower base-plate C and through the spring. The clip-bar should, of course, be used in lieu of the through-bolts; but I prefer the bolt. This coring out between the plates C F and projecting the bosses downward makes it light and graceful in appearance as well as strong, and is the preferred form.

I claim—

1. A spring bracket composed of the base plate C, the top plate F, one or more bosses E, connecting the parts together, and the spring seat formed between the plates and bosses, substantially as specified.

2. An angle bracket composed of the top plate F, the bosses E, E, connecting the same to the base plate, C, and a shield $c$ formed integral therewith, substantially as specified.

3. A spring bracket formed of the plates C, F, having plane face and adapted to be attached to the inclined vehicle body, and a spring seat formed of the base plate C, the bosses E, E, and means for bolting the spring in its seat, substantially as specified.

In testimony whereof I have hereunto set my hand.

WILLIAM J. KAUFFMAN.

Witnesses:
W. A. REITER,
A. F. GWINNER.